United States Patent

[11] 3,612,231

| [72] | Inventor | Jean-Marc Hauth<br>Pont-A-Mousson, France |
|---|---|---|
| [21] | Appl. No. | 43,719 |
| [22] | Filed | June 5, 1970 |
| [45] | Patented | Oct. 12, 1971 |
| [73] | Assignee | Centre De Recherches De Pont-a-Mousson<br>Pont-a-Mousson, France |
| [32] | Priority | Aug. 6, 1969 |
| [33] | | France |
| [31] | | 26981 |

[54] BRAKE HAVING A VENTILATED ROTOR
5 Claims, 3 Drawing Figs.

[52] U.S. Cl. .................................................. 188/264 A,
188/71.6, 192/113 A
[51] Int. Cl. ...................................................... F16d 65/84
[50] Field of Search ............................................ 188/71.6,
73.2, 218 XL, 264 A, 264 AA; 192/107 R, 113 A

[56] References Cited
UNITED STATES PATENTS

| 3,378,117 | 4/1968 | Stacy ............................. | 188/264 A |
| 3,491,856 | 1/1970 | Dean ............................. | 188/264 A |

*Primary Examiner*—George E. A. Halvosa
*Attorney*—J. Delattre-Seguy

ABSTRACT: Wheel brake having a ventilated rotor consisting of two discs defining radial air passages. One of the discs is fixed to a drum adapted to be secured to the wheel to be braked and a circular arrangement of plates pivoted to the drum is so arranged that the plates pivot in opposition to spring return means to a position in which they are applied against the inner periphery of the other disc so as to close the air passage as soon as a predetermined speed of rotation of the wheel is reached.

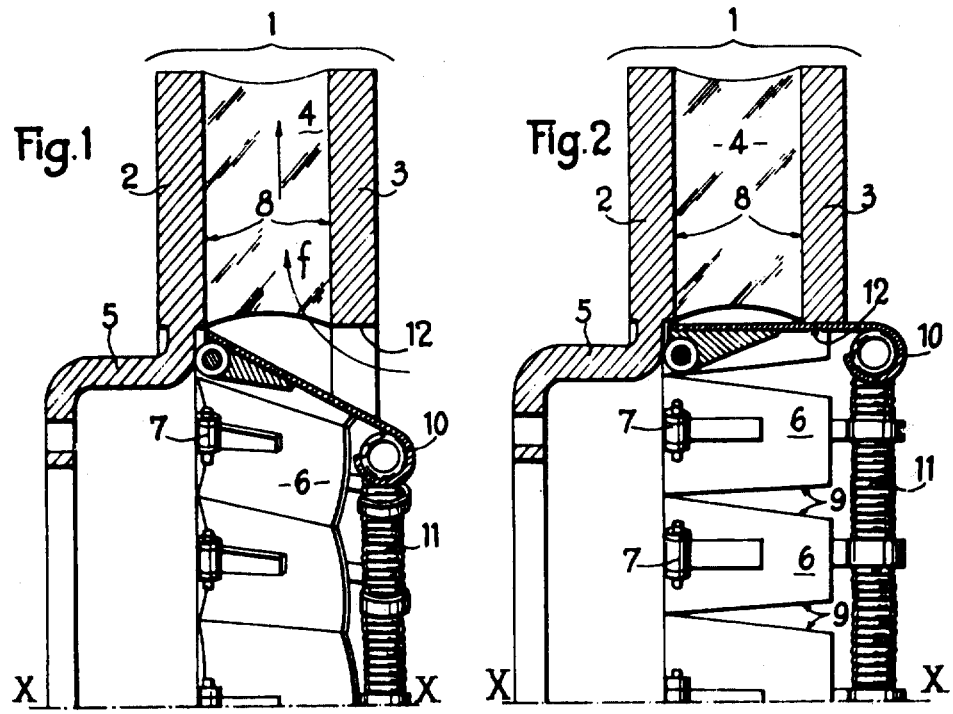
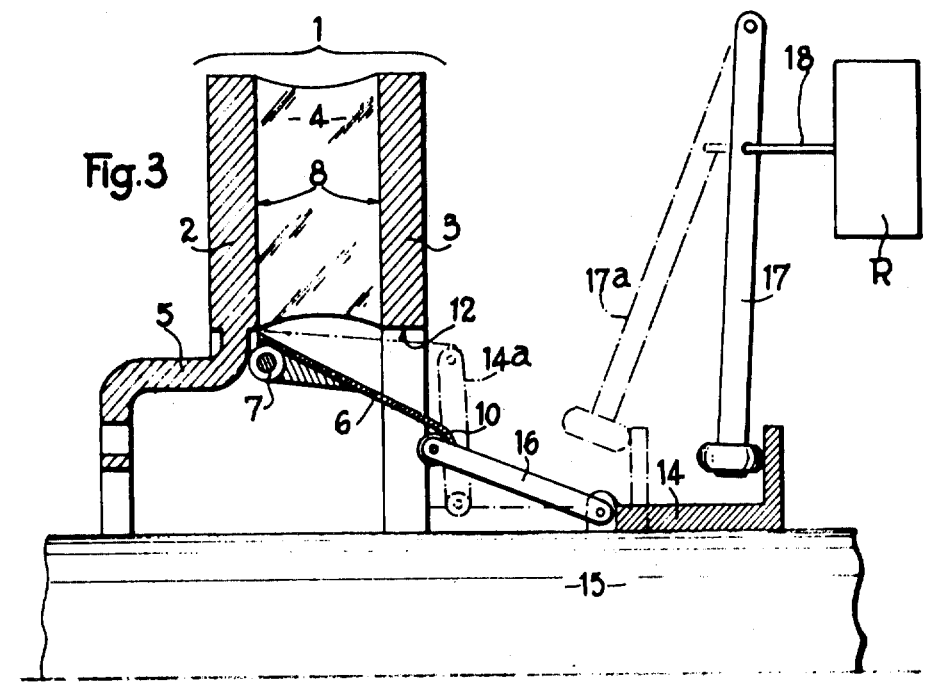

BRAKE HAVING A VENTILATED ROTOR

The invention relates to brakes having a ventilated rotor and a brake disc for a vehicle, and more particularly for railway vehicles, and in particular means for limiting the ventilation of said brakes.

It is known that the brake rotors are usually ventilated so as to dissipate the energy stored by the rotors when the brake linings rub against these rotors. The latter usually comprise two discs having opposed friction faces interconnected by spacer members, the ventilation being achieved by a circulation of air between the two discs.

It is known to reduce the circulation of the air between the two discs so as to reduce the power consumed for ventilating purposes when the rotor rotates at high speed (above about 150 kilometers per hour). In the known brakes, the air is prevented from entering the rotor by a plane circular plate which is concentric with the axis of rotation of the rotor and bears internally under the action of a spring against one of the discs, the other being fixed to the axle by a solid drum. In normal operation, the plate is urged against the disc and the air therefore cannot enter between the two discs. On the other hand, when braking, a device connected to the brake control mechanism shifts the circular plate away from the corresponding disc so as to allow the circulation of the air and the dissipation of the energy produced by the rubbing of the brake linings or elements on the outer faces of the rotor. The circular plate is therefore separated from the disc only during braking.

This known device has the serious drawback of eliminating the cooling of the rotor by the ventilation as soon as braking ceases. Now, the brakes are applied usually during rather short periods and this does not allow a sufficient cooling of the rotor.

The object of the invention is to provide a wheel brake having a ventilated rotor of the type comprising two discs defining therebetween a radial passage for ventilating air, one of said discs being integral with the wheel to be braked through a solid drum and comprising a ventilation limiting device, said brake being so improved as to overcome the aforementioned drawback.

In the brake according to the invention, said ventilation limiting device comprises a circular arrangement of pivoted plates each of which is pivoted by means of a hinge on the drum integral with one of the discs and is capable of being applied by a pivotal movement against the inner edge of the second disc under the effect of centrifugal force, said plates being combined with return means for returning the plates to a withdrawn opening position, said return means and the mass of the plates being such that the plates are automatically applied against the second disc as soon as a given limit speed of rotation of the rotor is reached.

Further features and advantages of the invention will be apparent from the ensuing description with reference to the accompanying drawing.

IN THE DRAWING

FIG. 1 is a diagrammatic sectional view of a brake according to the invention, the ventilation limiting device being in the position for allowing circulation of air;

FIG. 2 is a diagrammatic view similar to FIG. 1, the ventilation limiting device being in a position for stopping circulation of air, and FIG. 3 is a diagrammatic sectional view of a modification of the invention.

In the embodiment shown in FIGS. 1 and 2, the invention is shown to be applied to a rotor 1 of a brake, this rotor comprising two discs 2 and 3 which are interconnected by spacer elements 4. The disc 2 is provided with a solid drum 5 for securing it to the wheel R to be braked. This rotor is provided with a ventilation limiting device comprising a ring arrangement of plates 6 constituting valves, this arrangement being concentric with the rotor 1 and disposed within the latter. Each of the plates is pivotally mounted at one end by a hinge 7 welded to the drum 5. These plates are equally spaced apart on the circumference of the drum and their pivot axes are tangent to this circumference. The plates have a trapezoidal shape and the wide sides of the plates are adjacent hinge 7 so as to constitute a ring arrangement of contiguous elements in the position thereof for opening the radial passage 8 between the discs 2 and 3. On the other hand, the plates 6 are in spaced relation to each other in the position thereof for closing or masking the passage 8 (FIG. 2) so that, owing to the triangular gaps 9 between the plates the closure of the passage 8 is only partial. At the end of the plate opposed to the hinge 7 each plate has a hook 10 which encompasses a coil spring 11 in the shape of an endless ring centered on the axis X—X of the rotor 1.

The brake according to the invention operates in the following manner:

When the vehicle starts to move off and the rotor 1 therefore starts to rotate, the plates 6 have their ends adjacent the hooks 10 held in a position adjacent the axis X—X by the spring 11 and these plates are in contiguous relation to each other (FIG. 1). When the rotor 1 reaches a given limit speed, the plates pivot about their hinges 7 under the effect of centrifugal force and overcome the action of the spring 11 which extends until the plates become applied against the inner edge 12 of the disc 3 (FIG. 2).

When applying the brake, so long as the speed of the rotor 1 exceeds this limit speed, the plates remain applied against the disc 3 and partly close the entrance of the radial air passage 8 in the rotor 1 (FIG. 2). On the other hand, when the speed of the rotor 1 drops below the limit speed, the centrifugal force decreases and the return spring 11 returns the plates to their open position so as to allow the cooling of the rotor by circulation of air in the direction of arrows $f$ (FIG. 1). The air flows through the passage 8 until the speed of the rotor 1 once more exceeds said limit speed.

By means of this arrangement, it is possible to cool the rotor by a flow of air as soon as the rotor rotates at a speed lower than said limit speed. Above the latter, the air flow is substantially reduced by the effect of the plates 6.

Thus, it is possible to cool the rotor after braking until the rotor has reached once again said limit speed. The consumption of power due to the flow of air in the rotor 1 is above all appreciable at high speed (1.5 kw. at 120 km. per hour, 10 kw. at 200 km. per hour). This is why, when a given limit speed is exceeded, the plates 6, in preventing a large flow of air in the rotor, decrease this consumption of power, which would otherwise very rapidly increase with the speed. At low speeds (120–150 km. per hour) when the consumption of power due to the flow of the air is low, it is unnecessary to prevent this flow of air. On the contrary, the braking requires cooling the rotor. Thus, the device according to the invention allows the rotor cooling time to be increased without resulting in a large loss of power due to the flow of the air in the rotor.

Note that owing to their trapezoidal shape, the plates 6 are not in contacting relation when they are in the position for closing the passage of air (FIG. 2). The ring arrangement of plates therefore allows a small amount of air to pass therethrough, which is sufficient for the ventilation while any large consumption of power is avoided.

FIG. 3 shows a modification of the invention in which the return spring 11 of the first embodiment is replaced by a collar 14 which is slidable on the axle or some other rotating shaft 15, this collar being connected through links 16 to the hooks 10 of the plates 6. The latter are opened or closed by the sliding movement of the collar 14 on the shaft 15 under the effect, for example, of a lever 17 of a centrifugal governor 18 which is responsive to the speed of the vehicle. At high speed, this lever 17 is in the position 17a as shown in dot-dash line and allows the plates to close the air inlet under the effect of centrifugal force. At low speed, the lever returns to the position shown in full line and causes the air inlet to be opened by the separation of the plates 6 from their seats.

Whereas in the first embodiment the plates 6 can be relatively heavy, so as to be responsive to centrifugal force in opposition to the action of the spring 11, in this modification they can be lighter, since in the direction of movement for closing the passage of air, they do not have to overcome the action of the lever 17 which moves back in following the collar 14 which is driven toward the left (as viewed in FIG. 3) from the position shown in full line to that shown at 14a in dot-dash line.

In the first embodiment, instead of having a single spring 11, a plurality of springs could be provided which pass through a group of hooks 10 and are interconnected, or there could be provided as many interhooked springs which extend through the hooks 10 as there are spaces between the hooks 10.

Further, in the second embodiment, the lever 17 can be shifted by any independent control device other than a centrifugal governor, for example by a pneumatic or electrical control device.

The plates 6 could overlap in the position for opening the passage 8 so as to reduce or eliminate the air inlet gaps 9 in their position for closing the passage 8.

Having now described my invention what I claim and desire to secure by Letters Patent is:

1. A brake for a wheel comprising a rotor having two discs defining radial ventilating air passage means, a drum integral with a first of said discs for connection to the wheel to be braked and a ventilation limiting device, said ventilation limiting device comprising a circular arrangement of plates each of which is pivotally connected to said drum and is capable of being applied by a pivotal movement against an inner edge of a second of said discs under the effect of centrifugal force, and return means combined with said plates for returning the plates to an opening position in which they are withdrawn from said inner edge, said return means and the mass of the plates being such that the plates are automatically applied against said second disc as soon as a given limit speed of rotation of the rotor is reached.

2. A brake as claimed in claim 1, wherein said plates have a trapezoidal shape and are wider at ends adjacent said pivotal connections than at ends of said plates remote from said pivotal connections, so as to constitute a ring arrangement of contiguous plates in said opening position and a ring arrangement of plates which define gaps therebetween when said plates are applied against said second disc so as to partially close said air passage means.

3. A brake as claimed in claim 1, wherein said return means comprise hooks provided at the ends of the plates opposed to said pivotal connections and spring means interconnecting said hooks.

4. A brake as claimed in claim 1, wherein said return means comprise a combination of an axially slidable collar, a control device operatively connected to said collar and links connecting said collar to ends of said plates opposed to said pivotal connections.

5. A brake as claimed in claim 4, wherein said control device comprises a centrifugal governor.